United States Patent
Zhang

(10) Patent No.: US 10,275,672 B2
(45) Date of Patent: Apr. 30, 2019

(54) METHOD AND APPARATUS FOR AUTHENTICATING LIVENESS FACE, AND COMPUTER PROGRAM PRODUCT THEREOF

(71) Applicants: BEIJING KUANGSHI TECHNOLOGY CO., LTD., Beijing (CN); PINHOLE (BEIJING) TECHNOLOGY CO., LTD., Beijing (CN)

(72) Inventor: Chi Zhang, Beijing (CN)

(73) Assignees: BEIJING KUANGSHI TECHNOLOGY CO., LTD., Beijing (CN); PINHOLE (BEIJING) TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 14/888,632

(22) PCT Filed: Apr. 29, 2015

(86) PCT No.: PCT/CN2015/077788
§ 371 (c)(1),
(2) Date: Nov. 2, 2015

(87) PCT Pub. No.: WO2016/172872
PCT Pub. Date: Nov. 3, 2016

(65) Prior Publication Data
US 2016/0350611 A1     Dec. 1, 2016

(51) Int. Cl.
*G06K 9/00*     (2006.01)
*G06K 9/46*     (2006.01)
(Continued)

(52) U.S. Cl.
CPC ..... *G06K 9/00906* (2013.01); *G06K 9/00248* (2013.01); *G06K 9/00281* (2013.01);
(Continued)

(58) Field of Classification Search
None
See application file for complete search history.

(56) References Cited

U.S. PATENT DOCUMENTS

| 5,771,306 A * | 6/1998 | Stork | G06K 9/00268 382/100 |
| 2002/0097910 A1* | 7/2002 | Guha | G06K 9/222 382/187 |

(Continued)

FOREIGN PATENT DOCUMENTS

| CN | 102622588 | 8/2012 |
| CN | 103440479 | 12/2013 |
| CN | 104200146 | 12/2014 |
| CN | 104376250 | 2/2015 |
| CN | 104966086 | 10/2015 |
| WO | 2014184436 | 11/2014 |

OTHER PUBLICATIONS

Kim, Sung-Suk. "Time-delay recurrent neural network for temporal correlations and prediction." Neurocomputing 20.1-3 (1998): 253-263.*

(Continued)

*Primary Examiner* — Sumati Lefkowitz
*Assistant Examiner* — David Perlman
(74) *Attorney, Agent, or Firm* — Hamre, Schumann, Mueller & Larson, P.C.

(57) ABSTRACT

There is provided a method and an apparatus for authenticating a liveness face, and a computer program product thereof. The method for authenticating a liveness face may comprises: generating a character string randomly and showing the same to an object to be authenticated; recognizing facial actions of the object to be authenticated; determining whether the facial actions match with pronun- (Continued)

ciation of the character string to obtain a first determination result; and judging whether the object to be authenticated is a liveness face based on the first determination result. In solutions of the method and apparatus for authenticating a liveness face and the computer program product thereof according to the embodiments of the present disclosure, whether the facial actions of the object to be authenticated match with the pronunciation of the character string generated randomly is determined, an object to be authenticated having no liveness face can be recognized effectively, so that attacks made by any attackers by means of non-liveness body tool can be kept away effectively.

17 Claims, 8 Drawing Sheets

(51) Int. Cl.
    *G06K 9/66*     (2006.01)
    *G10L 15/22*     (2006.01)
    *G10L 17/10*     (2013.01)
    *G10L 17/24*     (2013.01)

(52) U.S. Cl.
    CPC ..... *G06K 9/00288* (2013.01); *G06K 9/00315* (2013.01); *G06K 9/00892* (2013.01); *G06K 9/46* (2013.01); *G06K 9/66* (2013.01); *G10L 15/22* (2013.01); *G10L 17/10* (2013.01); *G10L 17/24* (2013.01); *G10L 2015/227* (2013.01)

(56) References Cited

U.S. PATENT DOCUMENTS

| | | | | |
|---|---|---|---|---|
| 2008/0159584 | A1* | 7/2008 | Kaneko | G06F 17/30265 382/100 |
| 2009/0138405 | A1* | 5/2009 | Blessing | G06F 21/32 705/67 |
| 2014/0109200 | A1* | 4/2014 | Tootill | G06F 21/32 726/5 |
| 2015/0227774 | A1* | 8/2015 | Balch | G06K 9/00033 382/124 |
| 2016/0011657 | A1* | 1/2016 | Estacio | G06F 3/013 345/156 |
| 2017/0149759 | A1* | 5/2017 | Wyn-Harris | H04L 63/08 |

OTHER PUBLICATIONS

International Search Report and Written Opinion issued in the corresponding International application No. PCT/CN2015/077788, dated Jan. 26, 2016, 20 pages.

Chinese Office Action, issued in the corresponding Chinese patent application No. 201580000312.5, dated Aug. 29, 2016, 10 pages.

Office Action issued for Chinese Application No. 201580000312.5, dated Dec. 23, 2016, 9 pages including English translation.

Third Office Action of corresponding Chinese Patent Application, Serial No. 201580000312.5 dated May 4, 2017, English translation, 7 pages.

* cited by examiner

METHOD AND APPARATUS FOR AUTHENTICATING LIVENESS FACE, AND COMPUTER PROGRAM PRODUCT THEREOF

TECHNICAL FIELD

The present disclosure relates to a field of face recognition technique, and more particular to a method and an apparatus for authenticating a liveness face, and a computer program product thereof.

BACKGROUND

Face recognition is a biometrics recognition technique for recognizing identity based on feature information of a human face. The face recognition utilizes a general camera as a recognition information acquisition device, acquires facial images of an object to be recognized in a non-contact manner, and then implement a recognition process by comparing the acquired images with those in a database. Recently, the face recognition technique has been applied to many fields such as a government, an army, a bank, a social welfare safeguard, an electronic business, a security defense, etc. For example, the face recognition system may be applied to deposit a bank account remotely, an entrance guard system, an authentication of transactions and operations remotely, etc.

In the application of identity recognition based on the face recognition, there is derived some malice method for identity recognition by cheating the authentication of the face. For example, attackers cheat the identity authentication of the face by counterfeiting facial actions of a specified person with a mask, or in a manner of playing a video or cartoon, etc. Thus, the identity authentication method based on face is likely failed to resist such attacks. In order to improve accuracy in the identity authentication, it may first authenticate that the object to be authenticated is a biology liveness body, and then recognize the identity of the object to be authenticated by comparing the face features of the object to be authenticated with the face features of respective users stored in the database. The process for authenticating the liveness body in the face recognition system can prevent the attacks made by the attackers with the photo, videos, cartoon, 3D face model or mask. Therefore, there is desired an effective solution for authenticating a liveness face in order to keep the attacks made by the attackers by means of non-liveness tool away effectively.

SUMMARY

Embodiments of the present disclosure provide a method and an apparatus for authenticating a liveness face, and a computer program product thereof, which are capable of recognizing an object to be authenticated without liveness face effectively, so that attacks made by any attackers by means of non-liveness body tool can be kept away effectively.

In a first aspect, there is provided a method for authenticating a liveness face. The method for authenticating a liveness face may comprises: generating a character string randomly and showing the same to an object to be authenticated; recognizing facial actions of the object to be authenticated; determining whether the facial actions match with pronunciation of the character string to obtain a first determination result; and judging whether the object to be authenticated is a liveness face based on the first determination result.

In connection with the first aspect, in one implementation of the first aspect, the recognizing facial actions of the object to be authenticated may comprise: acquiring a facial image of the object to be authenticated; analyzing the facial image to obtain attributes of a face; and determining the facial actions based on the obtained attributes of the face.

In connection with the first aspect and the above implementation, in another implementation of the first aspect, the analyzing the facial image to obtain attributes of the face may comprise obtaining positions of key points on the face as the attributes of the face by analyzing each frame of the facial image; and the determining the facial actions based on the obtained attributes of the face may comprise determining the facial actions based on changes in the positions of the key points in respective frames of facial image.

In connection with the first aspect and the above implementations, in another implementation of the first aspect, the determining whether the facial actions match with the pronunciation of the character string may comprise: determining whether the facial actions match with the pronunciation of the character string by using a trained neuronal network.

In connection with the first aspect and the above implementations, in another implementation of the first aspect, the trained neuronal network may be obtained by operations as follows: acquiring a plurality of training images corresponding to the character string, the respective training images comprising facial images of different persons as they speak the character string; determining specified key points which are easy to be covered by a mask among key points on the face; generating feature vector sequence corresponding to a plurality of key points including the specified key points on the face in each of the training images; and training the neuronal network by using the generated respective feature vector sequences.

In connection with the first aspect and the above implementations, in another implementation of the first aspect, the determining whether the facial actions match with the pronunciation of the character string by using a trained neuronal network may comprise: determining, by the trained neuronal network, a probability that the object to be authenticated speaks the character string based on the facial actions; and determining the facial actions match with the pronunciation of the character string when the determined probability is greater than a predetermined probability.

In connection with the first aspect and the above implementations, in another implementation of the first aspect, the method for authenticating liveness face may further comprise: acquiring audio information of the object to be authenticated during a predetermined period of time; and determining whether the audio information matches with the pronunciation of the character string to obtain a second determination result.

In connection with the first aspect and the above implementations, in another implementation of the first aspect, the judging whether the object to be authenticated is a liveness face based on the first determination result comprises: judging whether the object to be authenticated is a liveness face based on both of the first determination result and the second determination result.

In connection with the first aspect and the above implementations, in another implementation of the first aspect, the judging whether the object to be authenticated is a liveness face based on both of the first determination result and the second determination result may comprise: judging that the object to be authenticated is not a liveness face if the second determination result indicates that the audio information does not match with the pronunciation of the character string; and in a case that the second determination result indicates that the audio information matches with the pronunciation of the character string, judging the object to be authenticated is a liveness face if the first determination result indicates that the facial actions match with the pronunciation of the character string, and judging the object to be authenticated is not a liveness face if the first determination result indicates that the facial actions do not match with the pronunciation of the character string.

In a second aspect, there is provided an apparatus for authenticating a liveness face. The apparatus for authenticating a liveness face may comprise: a processor; a storage; and computer program instructions stored in the storage. As executed by the processor, the computer program instructions may perform steps of generating a character string randomly and showing the same to an object to be authenticated; recognizing facial actions of the object to be authenticated; determining whether the facial actions match with pronunciation of the character string to obtain a first determination result; and judging whether the object to be authenticated is a liveness face based on the first determination result.

In connection with the second aspect, in one implementation of the second aspect, the recognizing facial actions of the object to be authenticated may comprise: acquiring a facial image of the object to be authenticated; analyzing the facial image to obtain attributes of a face; and determining the facial actions based on the obtained attributes of the face.

In connection with the second aspect and the above implementation, in another implementation of the second aspect, the analyzing the facial image to obtain attributes of the face may comprise obtaining positions of key points on the face as the attributes of the face by analyzing each frame of the facial image; and the determining the facial actions based on the obtained attributes of the face may comprise determining the facial actions based on changes in the positions of the key points in respective frames of facial image.

In connection with the second aspect and the above implementations, in another implementation of the second aspect, the determining whether the facial actions match with the pronunciation of the character string may comprise: determining whether the facial actions match with the pronunciation of the character string by using a trained neuronal network.

In connection with the second aspect and the above implementations, in another implementation of the second aspect, the trained neuronal network is obtained by operations as follows: acquiring a plurality of training images corresponding to the character string, the respective training images comprising facial images of different persons as they speak the character string; determining specified key points which are easy to be covered by a mask among key points on the face; generating feature vector sequence corresponding to a plurality of key points including the specified key points on the face in each of the training images; and training the neuronal network by using the generated respective feature vector sequences.

In connection with the second aspect and the above implementations, in another implementation of the second aspect, the determining whether the facial actions match with the pronunciation of the character string by using a trained neuronal network may comprise: determining, by the trained neuronal network, a probability that the object to be authenticated speaks the character string based on the facial actions; and determining the facial actions match with the pronunciation of the character string when the determined probability is greater than a predetermined probability.

In connection with the second aspect and the above implementations, in another implementation of the second aspect, the apparatus for authenticating a liveness face may further comprise an audio collecting device. As executed by the processor, the computer program instructions may perform steps of acquiring, by the audio collecting device, audio information of the object to be authenticated during a predetermined period of time; and determining whether the audio information matches with the pronunciation of the character string to obtain a second determination result.

In connection with the second aspect and the above implementations, in another implementation of the second aspect, the judging whether the object to be authenticated is a liveness face based on the first determination result comprises: judging whether the object to be authenticated is a liveness face based on both of the first determination result and the second determination result.

In connection with the second aspect and the above implementations, in another implementation of the second aspect, the judging whether the object to be authenticated is a liveness face based on both of the first determination result and the second determination result may comprise: judging that the object to be authenticated is not a liveness face if the second determination result indicates that the audio information does not match with the pronunciation of the character string; and in a case where the second determination result indicates that the audio information matches with the pronunciation of the character string, judging the object to be authenticated is a liveness face if the first determination result indicates that the facial actions match with the pronunciation of the character string, and judging the object to be authenticated is not a liveness face if the first determination result indicates that the facial actions do not match with the pronunciation of the character string.

In a third aspect, there is provided a computer program product for authenticating a liveness face, which comprises a computer-readable storage medium on which computer program instructions are stored. As executed by a processor, the computer program instructions enables the processor to: generate a character string randomly and show the same to an object to be authenticated; recognize facial actions of the object to be authenticated; determine whether the facial actions match with pronunciation of the character string to obtain a first determination result; and judge whether the object to be authenticated is a liveness face based on the first determination result.

In a fourth aspect, there is provided an apparatus for authenticating a liveness face. The apparatus for authenticating a liveness face may comprise: a character generator configured to generate a character string randomly and show the same to an object to be authenticated; an action recognition unit configured to recognize facial actions of the object to be authenticated; a first matching unit configured to determine whether the facial actions match with pronunciation of the character string to obtain a first determination result; and a judgment unit configured to judge whether the object to be authenticated is a liveness face based on the first determination result.

In solutions of the method and apparatus for authenticating a liveness face and the computer program product thereof according to the embodiments of the present disclosure, by determining whether the facial actions of the object to be authenticated match with the pronunciation of the character string generated randomly, it can recognize an object to be authenticated without liveness face effectively, so that attacks made by any attackers by means of non-liveness body tool can be kept away effectively.

BRIEF DESCRIPTION OF THE DRAWINGS

In order to explain solutions in embodiments of the present disclosure or the prior art more clearly, drawings required as describing the embodiments of the present disclosure or the prior art will be introduced briefly below. Obviously, the drawings described below are only some embodiments of the present disclosure, but those ordinary skilled in the art may obtain other drawings according to these drawings.

DETAILED DESCRIPTION

Thereafter, solutions of embodiments of the present disclosure will be described clearly and completely in connection with drawings of the embodiments of the present disclosure, but obviously the described embodiments are only some, but not all of the embodiments of the present disclosure. If no conflicts, the embodiments and features in the embodiments in the present application can be combined with each other arbitrarily.

Figure 1:
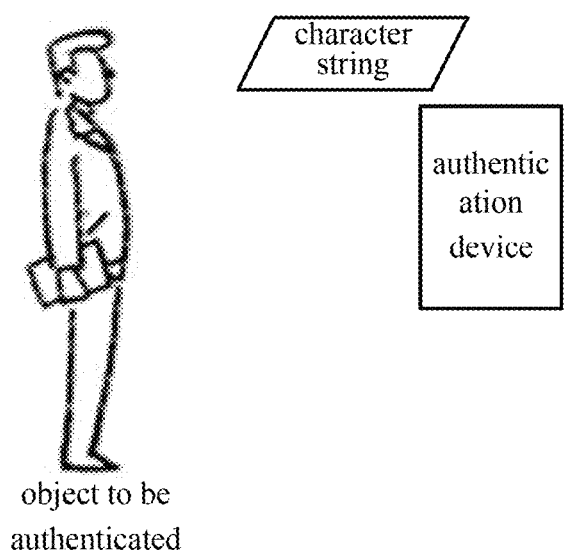
FIG. 1 illustrates a scene architecture for authenticating a liveness face according to embodiments of the present disclosure.

FIG. 1 illustrates a scene architecture for authenticating a liveness face according to embodiments of the present disclosure. As illustrated in FIG. 1, an object to be authenticated faces to an authentication device, and the authentication apparatus generates a character string randomly. The authentication apparatus recognizes facial actions of the object to be authenticated when he/she speak the character string, and then judges whether the recognized facial actions match with pronunciation of the character string. The object to be authenticated is authenticated as a liveness face when the recognized facial actions match with the pronunciation of the character string. The object to be authenticated is authenticated as non-liveness face when the recognized facial actions do not match with the pronunciation of the character string.

The character string may be, for example, "ni hao", "12345", "Hello World", etc. The character string is generated randomly, therefore non-liveness body, such as a photo, a video, a cartoon, a 3D face model or a mask, can not present the facial actions corresponding to the pronunciation of the character string. Thus, the object to be authenticated having no liveness face is recognized effectively, so that attacks made by any attackers by means of non-liveness body tool can be kept away effectively. The character string may be words, numbers and the like, which have a clear and definite meaning and would not be ambiguous, thus different objects to be authenticated can understand the meanings identically and make one and the same response. Further, combinations for the character string would be infinite in theory, therefore the attackers can not predict the contents of the character string generated randomly at all and it is not easy for them to prepare the character string in advance.

Figure 2:
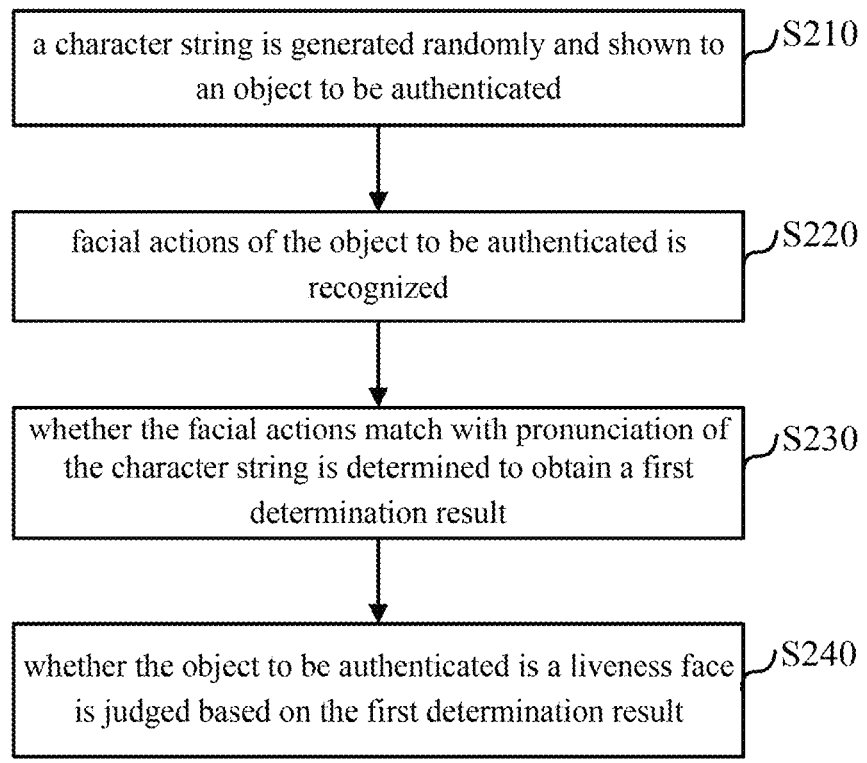
FIG. 2 is a flowchart exemplarily illustrating a method for authenticating a liveness face according to the embodiments of the present disclosure.

FIG. 2 is a flowchart exemplarily illustrating a method 200 for authenticating a liveness face according to the embodiments of the present disclosure. The method 200 for authenticating a liveness face is applicable to the authentication apparatus shown in FIG. 1. As illustrated in FIG. 2, the method 200 for authenticating a liveness face may comprises: generating a character string randomly and showing the same to an object to be authenticated (S210); recognizing facial actions of the object to be authenticated (S220); determining whether the facial actions match with pronunciation of the character string to obtain a first determination result (S230); and judging whether the object to be authenticated is a liveness face based on the first determination result (S240).

In S210, the character string may be selected randomly from a plurality of character strings prepared in advance and shown to the object to be authenticated. Alternatively, several characters and/or numbers may be selected from a library, for example, a character library, and combined randomly, as the character string. Further, various algorithms may be utilized to generate the character string randomly. Because the character string is generated randomly, the attackers can not be aware of its content in advance, such that they can not speak the character string with a photo, a video, a cartoon, a 3D face model or a mask prepared in advance. Thus, it can recognize an object to be authenticated having no liveness face effectively, so that attacks made by any attackers by means of non-liveness body tool can be kept away effectively.

The character string may be displayed on a display screen such as a liquid crystal display screen, a projection screen, a LED screen and the like, or also may be output with a speaker. Detailed presentation manner of the character string would not construct limitations on the embodiments of the present disclosure, as long as the object to be authenticated can acquire the character string. Besides the character string, prompt information may also be shown to the object to be authenticated. The prompt information is used to guide a user to cooperate with the authentication so as to enhance an accuracy of the authentication. For example, the prompt information may be information for prompting the user to speak the character string loudly, particularly, such as "please speak the displayed character string loudly". Alternatively, the prompt information may also be "do not make faces" and the like. The face may have different expressions. Actions made by a face may be different as the face speaks the character string in the different expressions. Therefore, the prompt information may prompt the user to cooperate with the authentication so as to enhance the accuracy of the authentication.

In S220, the facial actions of the object to be authenticated are recognized. When the object to be authenticated speaks the character string, changes would occur in his/her facial actions, especially around his/her mouth. Also, the facial action may vary as the content of the character string changes. That is to say, there is a one-to-one correspondence relationship between the facial actions and the pronunciation of the character string. Correspondingly, contents made by the pronunciation may be determined according to the facial actions. Further, it may limit a time taken for speaking the character string by the object to be authenticated. That is, the facial actions of the object to be authenticated during a predetermined period of time are recognized. The predetermined period of time is a specified period of time after the character string is shown. Setting of the period of time may increase authentication efficiency and avoid the attackers to take further attack measures. If no facial actions are made by the object to be authenticated during the predetermined period of time, or the facial actions do not correspond to the pronunciation of the shown character string, the object to be authenticated may be determined as a non-liveness face.

Figure 3:
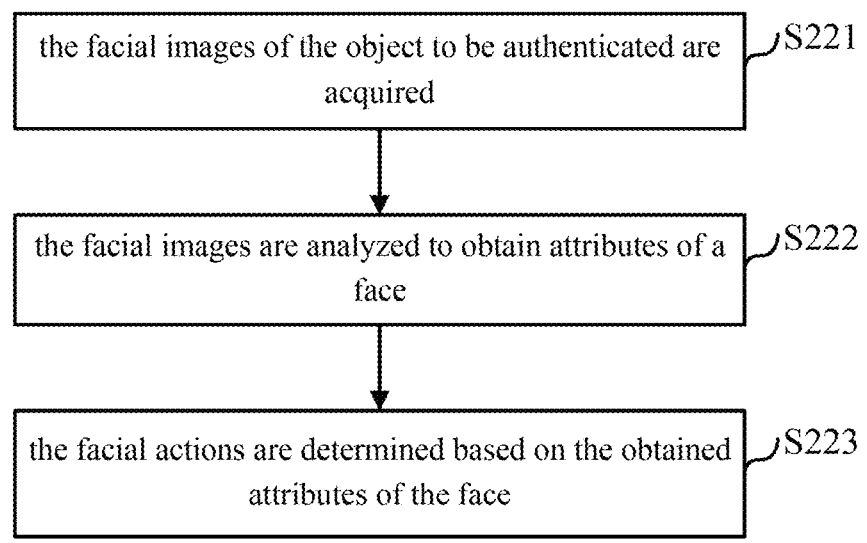
FIG. 3 is a flowchart exemplarily illustrating a process for recognizing a facial actions in the method for authenticating a liveness face in FIG. 2.

In S220, positions on the face, such as the mouth, the jaw, the lip, etc., may be located, and the facial actions of the object to be authenticated may be recognized according to moving trajectories of the positions located; alternatively, facial images of the object to be authenticated may further be collected through an image collector, and the facial actions of the object to be authenticated may be recognized by analyzing the images. FIG. 3 is a flowchart exemplarily illustrating a process S220 for recognizing the facial actions in the method for authenticating a liveness face in FIG. 2. As illustrated in FIG. 3, the facial image of the object to be authenticated is acquired (S221); the facial image is analyzed to obtain attributes of a face (S220); and the facial actions are determined based on the obtained attributes of the face (S223).

In S221, the facial image of the object to be authenticated during he/she speaks the character string may be collected continuously by the image collector. The collected facial image is typically a plurality of frames of images. The image collector may be a normal color or gray camera based on visible light, for example, a network camera, a front-facing camera on a mobile phone, etc.

In S222, the attributes of the face may be obtained by analyzing the plurality of collected frames of images. As an example, it may determine whether a face is included in the acquired image firstly, and then key points on the face may be located as the attributes of the face in a case that the face is detected. The key points on the face are some key points having a strong representation ability on the face, for example, the eye, the canthus, the center in the eye, the eyebrow, the nose, the apex nasi, the mouth, the angulus oris, the face profile and the like. That is to say, positions of the key points on the face are obtained by analyzing the each frame of facial image as the attributes of the face in S222. As an example, a parameter model may be created and learned according to representation characteristics around the key point based on a parameter shape model, which may optimize the position of the key point iteratively as used and obtain a coordinate of the key point. Alternatively, the key point may be located by a cascade regression scheme which may locate the key points on the face accurately in real time according to the input facial images. Detailed manners for acquiring the position of the key point on the face would not construct limitations on the embodiments of the present disclosure. And, besides the position of the key point on the face, the attribute of the face may further be a trajectory of the facial action, etc.

In S223, the facial actions are determined based on the obtained attributes of the face. In a case where the attribute of the face only comprises the key points on the face, the facial actions may be determined based on changes in the positions of the key points in respective frames of facial image. As an example, the facial actions are recognized by means of various calculation methods, such as an iterative calculation, a fuzzy computation, etc., based on the calculated key points on the face and a facial key point model in a facial action model library. Alternatively, a plurality of face pictures corresponding to the facial actions specified (for example, the facial actions corresponding to the pronunciation of the character string) in advanced may be obtained previously, the detailed facial actions are labelled manually, the facial action model library is established in advance by a machine learning method, and the facial actions are determined based on the facial action model library.

In the step S230 shown in FIG. 2, it is determined whether the facial actions recognized in S220 match with the pronunciation of the character string. Action models for the pronunciations of the different characters may be established in advance, and a reference action model for the pronunciation of the character string may be generated based on the action models for the pronunciations of the respective characters after the character string is generated, and then the facial actions recognized in S220 is compared with the reference action model to determine whether the recognized facial actions match with the pronunciation of the character string. Alternatively, the S230 may be performed by a trained neuronal network, which would be described below in connection with FIG. 4.

Figure 4:
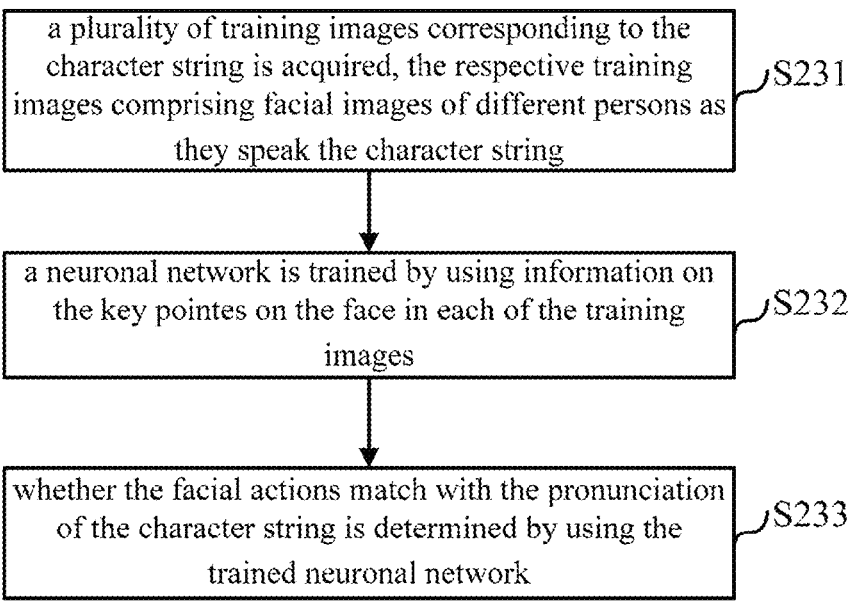
FIG. 4 is a flowchart exemplarily illustrating a process for matching the facial actions with the pronunciation of the character string in the method for authenticating a liveness face in FIG. 2.

FIG. 4 is a flowchart exemplarily illustrating a process S230 for matching the facial actions with the pronunciation of the character string in the method for authenticating a liveness face in FIG. 2. As shown in FIG. 4, the determining whether the facial actions match with the pronunciation of the character string may comprise: acquiring a plurality of training images corresponding to the character string, the respective training images comprising facial images of different persons as they speak the character string (S231); training a neuronal network by using information on the key points on the face in each of the training images (S232); determining whether the facial actions match with the pronunciation of the character string by using the trained neuronal network (S233).

In S231, for example, a great deal of persons' speech videos may be collected from an internet network, a cable television network and the like, and speech contents corresponding to the speech videos may be labelled, namely the contents of the character.

In S232, the neuronal network may be trained as follows: determining the information on the key points on the face in each of the training images; generating feature vector sequence corresponding to the plurality of key points on the face in each of the training images; and training the neuronal network by using the generated respective feature vector sequences. Further, part of the key points may be easy to be covered by a mask in a case that the attacker uses the mask, therefore the training for the key points be easy to be covered may be emphasized. Correspondingly, specified key points which are easy to be covered by the mask among the key points on the face may be determined in S232; generating the feature vector sequence corresponding to the plurality of key points including the specified key points on the face in each of the training images; and training the neuronal network by using the generated respective feature vector sequences. The speech contents labelled mutually are corresponding training objects. The neuronal network may have, but is not limited on, a structure as follows: an input layer, configured to receive the feature vector sequences; a convolution layer, configured to smooth the input vectors and extract their features; a feedback layer, configured to extract current input features by associating the previous and later input features, the feedback layer may, but is not limited to, be implemented by a Long Short Term Memory (LSTM); a fully connected layer, configured to further abstract the features; and an output layer, configured to output a final judgment result, the output layer may, but is not limited to, be implemented by a Connectionist Temporal Classification (CTC).

In S233, whether the facial actions match with the pronunciation of the character string is determined by using the trained neuronal network. As an example, the trained neuronal network: determines a probability that the object to be authenticated speaks the character string based on the facial actions; determines that the facial actions match with the pronunciation of the character string when the determined probability is greater than a predetermined probability; and determines that the facial actions do not match with the pronunciation of the character string when the determined probability is smaller than or equal to the predetermined probability.

In certain instances, generally the steps S231 and S232 are completed before the detailed authentication process, that is, generally a neuronal network trained in advance is utilized to determine whether the facial actions match with the pronunciation of the character string in the method for authenticating a liveness face.

In S240 of FIG. 2, it is judged whether the object to be authenticated is a liveness face based on the first determination result. The object to be authenticated is judged as a liveness face if the first determination result indicates that the facial actions match with the pronunciation of the character string, and the object to be authenticated is judged as being not a liveness face if the first determination result indicates that the facial actions do not match with the pronunciation of the character string. For example, in a case that the attackers make the attack by using the mask and/or photo, no facial actions can be recognized, thus it can be judged that the object to be authenticated is not a liveness face; in a case that the attackers make the attack by using the video, the facial actions of the face in the video do not correspond to the pronunciation of the character string because the attackers can not determine in advance the content of the character string generated randomly, thus the object to be authenticated can be determined as a non-liveness face.

As an application example for authenticating a liveness face, in an identity recognition system based on face recognition, generally face features of the object to be authenticated would be further compared with face features of respective users stored in a database in order to identify the identity of the object to be authenticated after the object to be authenticated is determined as a liveness face. Further, the authentication of a liveness face may be applied to any other system, and its detailed applications would not construct limitations on the embodiments of the present disclosure.

In solution of the method for authenticating a liveness face according to the embodiments of the present disclosure, by determining whether the facial actions of the object to be authenticated match with the pronunciation of the character string generated randomly, it can recognize an object to be authenticated without liveness face effectively, so that attacks made by any attackers by means of non-liveness body tool can be kept away effectively.

Figure 5:
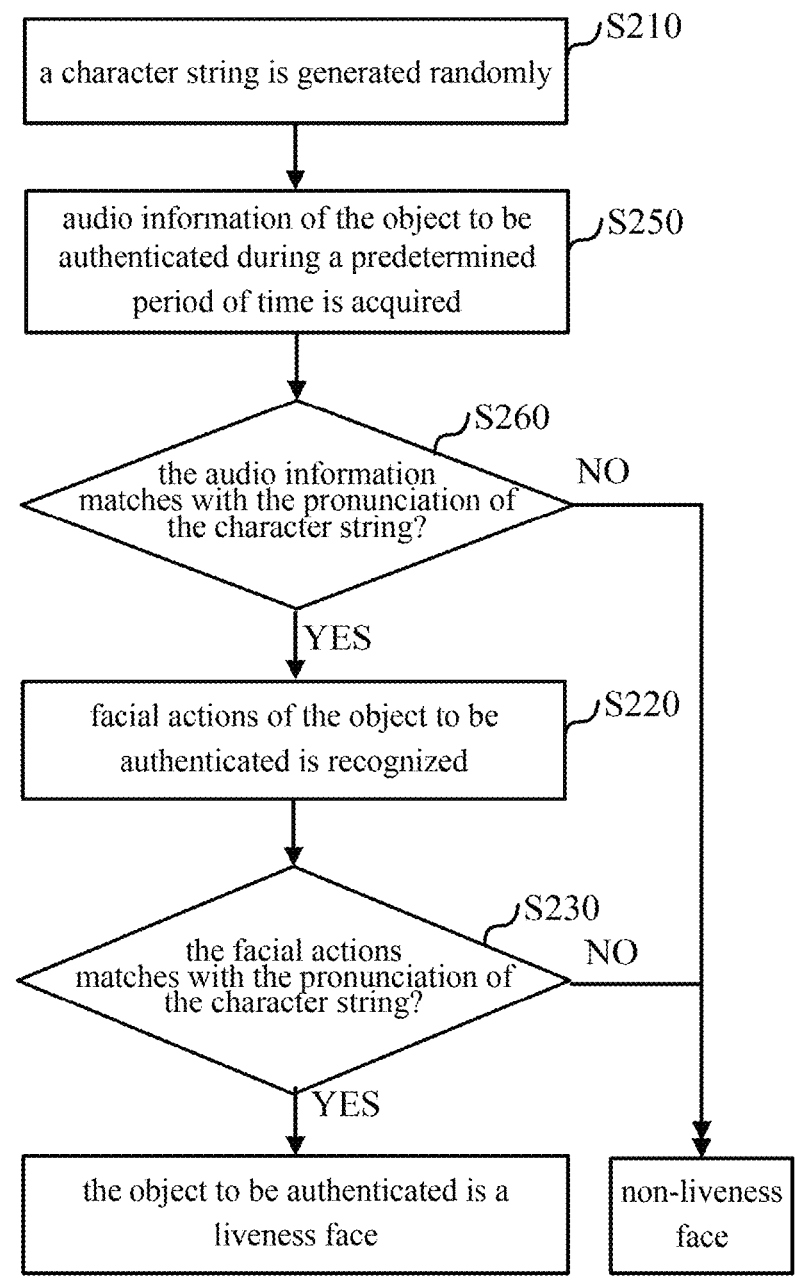
FIG. 5 is a flowchart exemplarily illustrating another method for authenticating a liveness face according to the embodiments of the present disclosure.

FIG. 5 is a flowchart exemplarily illustrating another method 500 for authenticating a liveness face according to the embodiments of the present disclosure. In FIG. 5, the same steps as those in FIG. 2 are labelled with same reference signs as those in FIG. 2, and their detailed descriptions may be referred to those made above in connection with FIGS. 2-4. Particularly, the steps S210, S220 and S230 in FIG. 5 are same as the corresponding steps in FIG. 2. Differences between FIG. 5 and FIG. 2 are in that steps S250 and S260 are added and operations in S240 are adjusted correspondingly.

As illustrated in FIG. 5, besides the steps S210, S220 and S230, the method 500 for authenticating a liveness face may further comprise: acquiring audio information of the object to be authenticated during a predetermined period of time (S250); and determining whether the audio information matches with the pronunciation of the character string to obtain a second determination result (260). In the process during which the object to be authenticated speaks the character string generated randomly in the predetermined period of time, the audio information of the object to be authenticated may be further recorded with a microphone while the image information thereof is recorded to recognize his/her facial actions (namely S250). Next, a corresponding text may be acquired by performing voice recognition on the recorded audio information in S260, and then the text is compared with the character string generated randomly, in order to determine whether the audio information matches with the pronunciation of the character string.

In S240, whether the object to be authenticated is a liveness face may be judged based on both of the first determination result in the S230 and the second determination result in S260. The object to be authenticated is judged as a non-liveness face if the audio information does not match with the pronunciation of the character string. For example, in the case that the attackers make the attack with the video and cartoon, the audio information in the video or cartoon is generally not identical with the contents of the character string generated randomly, therefore the audio information is determined to be not matched with the pronunciation of the character string by the steps S250 and S260, thus the attack by a counterfeiter is recognized. Processing for the audio information is relative simple and rapid, therefore the audio information may be used to screen the attackers initially. The steps S220 and S230 are then performed to determine whether the facial actions match with the pronunciation of the character string when the audio information matches with the pronunciation of the character string. Further, the steps S220 and S230 may be performed simultaneously when the steps S250 and S260 are performed, so as to improve processing speed.

In a case where the second determination result indicates that the audio information matches with the pronunciation of the character string, the attackers can be further recognized according to the first determination result. Particularly, the object to be authenticated is judged as a liveness face if the first determination result indicates that the facial actions match with the pronunciation of the character string; and the object to be authenticated is judged as a non-liveness face if the first determination result indicates that the facial actions do not match with the pronunciation of the character string. Therefore, in solution of the method 500 for authenticating a liveness face in FIG. 5, it may further increase the accuracy and efficiency of the authentication of a liveness face.

Figure 6:
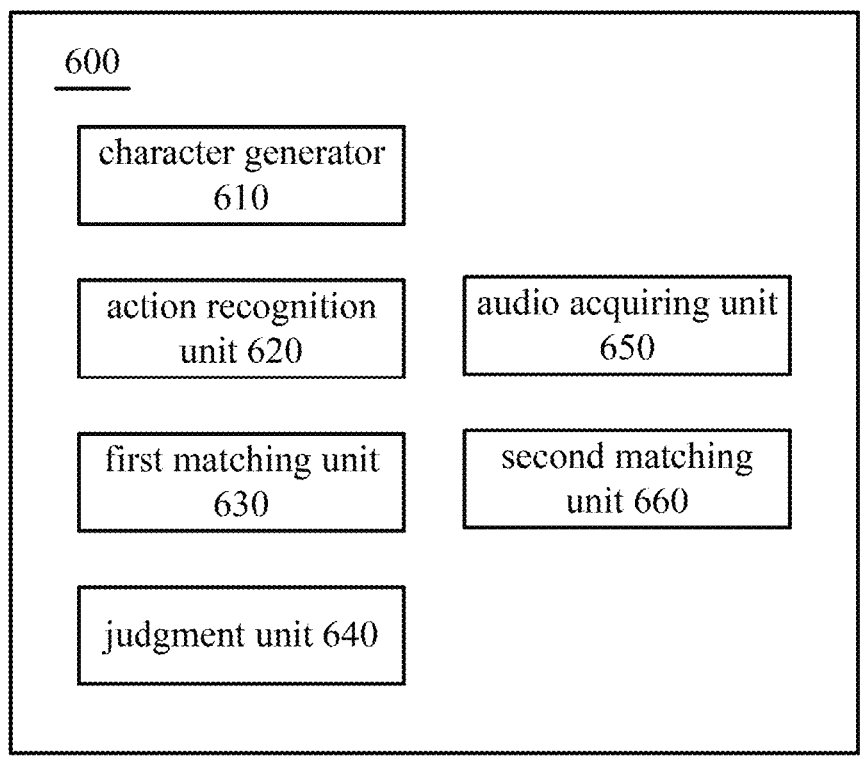
FIG. 6 is a block diagram exemplarily illustrating an apparatus for authenticating a liveness face according to the embodiments of the present disclosure.

FIG. 6 is a block diagram exemplarily illustrating an apparatus 600 for authenticating a liveness face according to the embodiments of the present disclosure. The apparatus 600 for authenticating a liveness face corresponds to the authentication apparatus illustrated in FIG. 1 and may be included within it. The apparatus 600 for authenticating a liveness face can perform the method for authenticating a liveness face described above. Since the details of operations performed by the apparatus 600 are substantively same as the method described previously in connection with FIGS. 2-5, the apparatus would be described briefly below and the same details would not be repeated herein in order to avoid repetitions.

As illustrated in FIG. 6, the apparatus 600 for authenticating a liveness face may comprise: a character generator 610 configured to generate a character string randomly and show the same to an object to be authenticated; an action recognition unit 620 configured to recognize facial actions of the object to be authenticated; a first matching unit 630 configured to determine whether the facial actions match with pronunciation of the character string to obtain a first determination result; and a judgment unit 640 configured to judge whether the object to be authenticated is a liveness face based on the first determination result. Part or all of operations of the character generator 610, the action recognition unit 620, the first matching unit 630 and the judgment unit 640 may be realized by a processor and a memory.

The character generator 610 may select the character string randomly from the plurality of character strings prepared in advance and show it to the object to be authenticated. Alternatively, the character generator 610 may select several characters and/or numbers from a library, for example, a character library, and combine the selected characters and/or numbers randomly, as the character string. Because the character string is generated randomly, the attackers can not be aware of its content in advance, such that they can not speak the character string by using a photo, a video, a cartoon, a 3D face model or a mask prepared in advance. The apparatus may be equipped with a display screen or a speaker, or be connected to the display screen or the speaker, in order to present the character string. The display screen may be a liquid crystal display screen, a projection screen, a LED screen and the like. Detailed presentation manner of the character string would not construct limitations on the embodiments of the present disclosure, as long as the object to be authenticated can acquire the character string.

Besides the character string, the character generator 610 may further represent a prompt information to the object to be authenticated. The prompt information is used to guide a user to cooperate with the authentication so as to enhance an accuracy of the authentication. For example, the prompt information may be information for prompting the user to speak the character string loudly, particularly, such as "please speak the displayed character string loudly". Alternatively, the prompt information may also be "do not make faces" and the like. The face may have different expressions. Actions made by a face may be different as the face speaks the character string with the different expressions. Therefore, the prompt information may prompt the user to cooperate with the authentication so as to enhance the accuracy of the authentication.

The action recognition unit 620 recognizes the facial actions of the object to be authenticated. When the object to be authenticated speaks the character string, changes would occur in his/her facial actions, especially around his/her mouth. Also, the facial action may vary as the content of the character string changes. That is to say, there is a one-to-one correspondence relationship between the facial actions and the pronunciation of the character string. Correspondingly, contents made by the pronunciation may be determined according to the facial actions. Further, the action recognition unit 620 may limit a time taken for speaking the character string by the object to be authenticated, that is, the facial actions of the object to be authenticated during a predetermined period of time are recognized. The predetermined period of time is a specified period of time after the character string is shown. Accordingly, the action recognition unit 620 may comprise a timer or be connected to the timer, in order to only recognize the facial actions during the predetermined period of time. Setting of the period of time may increase authentication efficiency and avoid the attackers to take further attack measures. If no facial actions are made by the object to be authenticated during the predetermined period of time, or the facial actions do not correspond to the pronunciation of the shown character string, the object to be authenticated may be determined as a non-liveness face.

Figure 7:
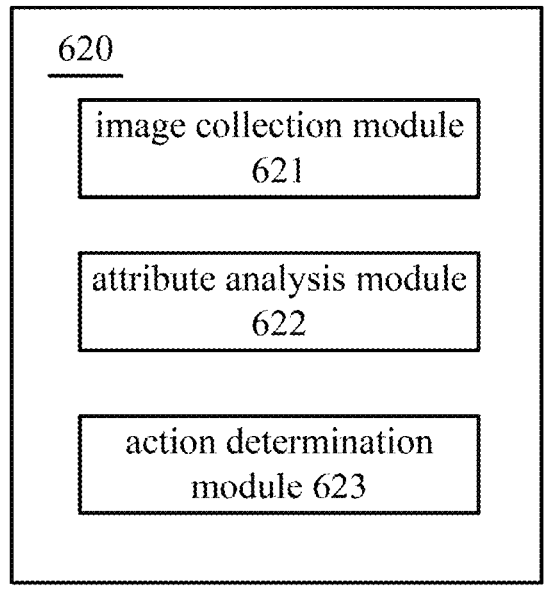
FIG. 7 is a block diagram exemplarily illustrating an action recognition unit in FIG. 6.

The action recognition unit 620 may locate positions of, for example, the mouth, the jaw, the lip on the face at first, and recognize the facial actions of the object to be authenticated according to moving trajectories of the positions located. Alternatively, the action recognition unit 620 may collect facial images of the object to be authenticated with an image collector, and recognize the facial actions of the object to be authenticated by analyzing the images. FIG. 7 is a block diagram exemplarily illustrating an action recognition unit 620 in FIG. 6. The action recognition unit 620 comprises an image collection module 621, an attribute analysis module 622 and an action determination module 623.

The image collection module 621 acquires the facial images of the object to be authenticated. For example, the image collection module 621 may be an image collector, which collects the facial image of the object to be authenticated when he/she speaks the character string continuously. The collected facial image is typically a plurality of frames of images. The image collector may be a normal color or gray camera based on visible light, for example, a network camera, a front-facing camera on a mobile phone, etc.

The attribute analysis module 622 analyzes the facial image to obtain attributes of the face. As an example, the attribute analysis module 622 may determine whether a face is included in the acquired image firstly, and then locate key points on the face as the attributes of the face in a case that the face is detected. The key points on the face are some key points having a strong representation ability on the face, for example, the eye, the canthus, the center in the eye, the eyebrow, the nose, the apex nasi, the mouth, the angulus oris, the face profile and the like. That is to say, the attribute analysis module 622 obtains positions of the key points on the face by analyzing the each frame of facial image as the attributes of the face. As an example, the attribute analysis module 622 may create and learn a parameter model according to representation characteristics around the key point based on a parameter shape model, optimize the position of the key point iteratively as used and obtain a coordinate of the key point. Alternatively, the attribute analysis module 622 may locate the key point by a cascade regression scheme. Detailed manners for acquiring the position of the key point on the face would not construct limitations on the embodiments of the present disclosure. And, besides the position of the key point on the face, the attribute of the face may further be a trajectory of the facial action, etc.

The action determination module 623 may determine the facial actions based on the obtained attributes of the face. In a case where the attribute of the face only comprises the key points on the face, the action determination module 623 may determine the facial actions based on changes in the positions of the key points in respective frames of facial image. As an example, the action determination module 623 recognizes the facial actions by means of various calculation methods, such as an iterative calculation, a fuzzy computation, etc., based on the calculated key points on the face and a facial key point model in a facial action model library. Alternatively, the action determination module 623 may previously obtain a plurality of face pictures corresponding to the facial actions specified (for example, the facial actions corresponding to the pronunciation of the character string) in advanced, label the detailed facial actions manually, establish the facial action model library in advance by a machine learning method, and determine the facial actions based on the facial action model library.

The first matching unit 630 in FIG. 6 determines whether the facial actions recognized by the action recognition unit 620 match with the pronunciation of the character string. The first matching unit 630 may establish action models for the pronunciations of the different characters in advance to perform the determination operation. For example, the first matching unit 630 generates a reference action model for the pronunciation of the character string based on the action models for the pronunciations of the respective characters after the character string is generated, and then compares the facial actions recognized by the action recognition unit 620 with the reference action model to determine whether the recognized facial actions match with the pronunciation of the character string. Alternatively, the first matching unit 630 may be realized by a neuronal network technique, which would be described below in connection with FIG. 8.

Figure 8:
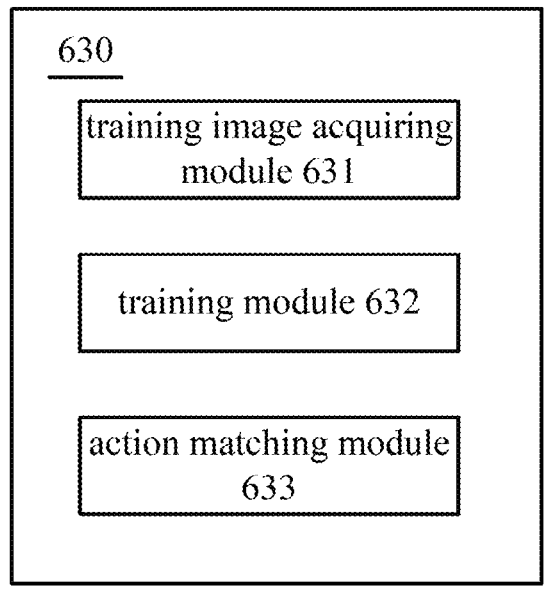
FIG. 8 is a block diagram exemplarily illustrating an first matching unit in FIG. 6.

FIG. 8 is a block diagram exemplarily illustrating the first matching unit 630 in FIG. 6. As shown in FIG. 8, the first matching unit 630 may comprise a training image acquiring module 631, a training module 632 and an action matching module 633.

The training image acquiring module 631 acquires a plurality of training images corresponding to the character string, the respective training images comprising facial images of different persons as they speak the character string. For example, the training image acquiring module 631 may collect a great deal of persons' speech videos from an internet network, a cable television network and the like, and label speech contents corresponding to the speech videos, namely the contents of the character. Alternatively, the training image acquiring module 631 may acquire a plurality of training images from a video content database.

The training module 632 trains a neuronal network by using information on the key points on the face in each of the training images. For example, the training module 632 may determine the information on the key points on the face in each of the training images, generate feature vector sequence corresponding to the plurality of key points on the face in each of the training images, and train the neuronal network by using the generated respective feature vector sequences. Further, part of the key points may be easy to be covered by a mask in a case that the attacker uses the mask, therefore the training for the key points which are easy to be covered may be emphasized. Correspondingly, the training module 632 may determine specified key points which are easy to be covered by the mask among the key points on the face, generate the feature vector sequence corresponding to the plurality of key points including the specified key points on the face in each of the training images, and train the neuronal network by using the generated respective feature vector sequences. The speech contents labelled mutually are used as corresponding training objects. As described above, the neuronal network may have an input layer, a convolution layer, a feedback layer, a fully connected layer, and an output layer, and its detailed structure would not construct limitations on the embodiments of the present disclosure.

The action matching module 633 determines whether the facial actions match with the pronunciation of the character string by using the trained neuronal network. As an example, through the trained neuronal network, the action matching module 633 determines a probability that the object to be authenticated speaks the character string based on the facial actions, determines that the facial actions match with the pronunciation of the character string when the determined probability is greater than a predetermined probability, and determines that the facial actions do not match with the pronunciation of the character string when the determined probability is smaller than or equal to the predetermined probability. In an actual application, the first matching unit 630 may be connected to a trained neuronal network to determine whether the facial actions match with the pronunciation of the character string, instead of comprising the training image acquiring module 631 and the training module 632.

In certain instances, the first matching unit 630 may utilize a neuronal network trained in advance to determine whether the facial actions match with the pronunciation of the character string. At this time, the first matching unit 630 may only comprise the action matching module 633 without the training image acquiring module 631 and the training module 632.

The judgment unit 640 in FIG. 6 judges whether the object to be authenticated is a liveness face based on the first determination result determined by the first matching unit 630. The judgment unit 640 judges the object to be authenticated as a liveness face if the first determination result indicates that the facial actions match with the pronunciation of the character string, and judges the object to be authenticated as a non-liveness face if the first determination result indicates that the facial actions do not match with the pronunciation of the character string.

For example, in a case that the attackers make the attack with the mask and/or photo, no facial actions can be recognized by the apparatus 600 for authenticating a liveness face, thus it can be judged that the object to be authenticated is not a liveness face; in a case that the attackers make the attack with the video, the apparatus 600 for authenticating a liveness face can find that the facial actions of the face in the video do not correspond to the pronunciation of the character string because the attackers can not determine in advance the content of the character string generated randomly, thus the object to be authenticated can be determined as a non-liveness face. As an application example for authenticating a liveness face, in an identity recognition system based on face recognition, generally face features of the object to be authenticated would be further compared with face features of respective users stored in a database in order to identify the identity of the object to be authenticated after the object to be authenticated is determined as a liveness face. Further, the apparatus 600 for authenticating a liveness face may be applied to any other system, and its detailed applications would not construct limitations on the embodiments of the present disclosure.

In solution of the apparatus for authenticating a liveness face according to the embodiments of the present disclosure, by determining whether the facial actions of the object to be authenticated match with the pronunciation of the character string generated randomly, it can recognize an object to be authenticated without liveness face effectively, so that attacks made by any attackers by means of non-liveness body tool can be kept away effectively.

Furthermore, the apparatus 600 for authenticating a liveness face may further comprise an audio acquiring unit 650 and a second matching unit 660, as denoted by dotted lines in FIG. 6. Part or all of operations performed by the audio acquiring unit 650 and the second matching unit 660 may be implemented by the processor and memory.

The audio acquiring unit 650 acquires audio information of the object to be authenticated during a predetermined period of time, and may be a microphone. In the process during which the object to be authenticated speaks the character string generated randomly in the predetermined period of time, the audio acquiring unit 650 records the audio information of the object to be authenticated through the microphone while the action recognition unit 620 collects the image information and recognize the facial actions.

The second matching unit 660 determines whether the audio information matches with the pronunciation of the character string to obtain a second determination result. For example, the second matching unit 660 may perform voice recognition on the recorded audio information to acquire a corresponding text, and then compare the text with the character string generated randomly, in order to determine whether the audio information matches with the pronunciation of the character string.

The judgment unit 640 may judge whether the object to be authenticated is a liveness face based on both of the first determination result and the second determination result. The judgment unit 640 may judge the object to be authenticated as a non-liveness face if the second determination result indicates that the audio information does not match with the pronunciation of the character string. For example, in the case that the attackers make the attack with the video and cartoon, the audio information in the video or cartoon is generally not identical with the contents of the character string generated randomly, therefore the audio acquiring unit 650 and the second matching unit 660 may determine that the audio information does not match with the pronunciation of the character string, thus the attack by a counterfeiter is recognized. Processing for the audio information is relative simple and rapid, therefore the audio information may be used to screen the attackers initially. The action recognition unit 620 and the first matching unit 630 operates to determine whether the facial actions match with the pronunciation of the character string when the audio information matches with the pronunciation of the character string. Further, in order to accelerate a processing speed, the action recognition unit 620 and the first matching unit 630 may operate simultaneously when the audio acquiring unit 650 and the second matching unit 660 operate.

In a case where the second determination result indicates that the audio information matches with the pronunciation of the character string, the judgment unit 640 further recognizes whether the object to be authenticated is a liveness face according to the first determination result. Particularly, the judgment unit 640 judges the object to be authenticated as a liveness face if the first determination result indicates that the facial actions match with the pronunciation of the character string and judges the object to be authenticated as a non-liveness face if the first determination result indicates that the facial actions do not match with the pronunciation of the character string. Therefore, it may further increase the accuracy and effective of the authentication of the liveness face.

Figure 9:
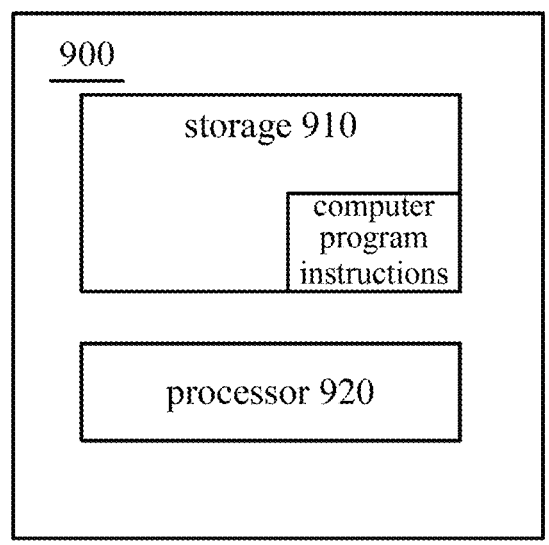
FIG. 9 is a block diagram exemplarily illustrating another apparatus for authenticating a liveness face according to the embodiments of the present disclosure.

FIG. 9 is a block diagram exemplarily illustrating another apparatus for authenticating a liveness face 900 according to the embodiments of the present disclosure. As illustrated in FIG. 9, the apparatus for authenticating a liveness face 900 may comprise a storage 910 and a processor 920. Computer program codes are stored on the storage 910. The processor 920 executes the computer program codes in order to implement the method for authenticating a liveness face described by referring to FIGS. 2-4.

The storage 910 may comprise at least one of a Read Only Memory (ROM) or a Random Access Memory (RAM), and provide the processor 920 with instructions and data. The number of the storage 910 may be one or more, which may be a volatile memory and/or a nonvolatile memory. The volatile memory may comprise, for example, a Random Access Memory (RAM) and/or a cache, etc. The nonvolatile memory may comprise, for example, a Read Only memory, a hard disk, a flash, etc. The storage 910 may further store the acquired image information, the acquired audio information and the like.

The processor 920 may be a general processor, a Digital Signal Processor (DSP), an Application Specific Integrated Circuit (ASIC), a Field-Programmable Gate Array (FPGA) or other programmable logic devices, discrete gates or transistors logic devices, discrete hard components, etc. The general processor may be a microprocessor or any other processors commonly used.

Although not shown, the apparatus 900 for authenticating a liveness face may further comprise an input device, an output device, a communication device and an image collector, which are interconnected via a bus system and/or a connection mechanism in other manners. The input device may be a device through which a user inputs his/her instructions, and may comprise one or more of a keyboard, a mouse, a microphone, a touch panel and the like. The instruction may be an instruction for shooting images by a camera. The output device may output various information to outside (for example, the user), for example, it represents the generated character string to the object to be authenticated, and may comprise one or more of a display, a speaker and the like. The communication device may communicate with other device (for example, a personal computer, a server, a mobile station, a base station and the like) via a network or other technique. The network may be an internet, a wireless local area network, a mobile communication network, etc, and the other technique may comprise, for example, a bluetooth communication, an infrared communication and the like. The image collector may shoot the images (for example, photos, videos) desired by the users, and store the shot images in the storage 910 to be used by other components. The input device, the output device, the communication device and the image collector may be properly selected and/or combined depending on actual requirements.

Besides the methods and devices described above, the embodiments of the present disclosure may further provide a computer program product for authenticating a liveness face. The computer program product comprises a computer-readable storage medium on which computer program instructions are stored. As executed by a processor, the computer program instructions may cause the processor to: generate a character string randomly and show the same to an object to be authenticated; recognize facial actions of the object to be authenticated; determine whether the facial actions match with pronunciation of the character string to obtain a first determination result; and judge whether the object to be authenticated is a liveness face based on the first determination result. Detailed operations may be referred to those made in connection with FIG. 2-4.

Furthermore, the computer program instructions may also cause the processor to: acquire audio information of the object to be authenticated during a predetermined period of time; and determine whether the audio information matches with the pronunciation of the character string to obtain a second determination result. Accordingly, in a case where the second determination result indicates that the audio information matches with the pronunciation of the character string, the object to be authenticated is judged as a liveness face if the first determination result indicates that the facial actions match with the pronunciation of the character string; and the object to be authenticated is judged as a non-liveness face if the first determination result indicates that the facial actions do not match with the pronunciation of the character string. Detailed description may be referred to those made in connection with FIG. 5.

Those skilled in the art can appreciate that the units and the steps of the algorithm in individual examples described in combination with the embodiments disclosed herein can be implemented in electronic hardware, or the combination of computer software and electronic hardware. Whether the functions are carried out in the form of hardware or in the form of software, it depends on the specific applications of the technical solution and constrains on the design thereof. Those skilled in the art can use different measures to implement the functions as described for each specific application, and such an implementation should not be considered as going beyond the scope of the present invention.

In the embodiments provided in the application, it should be understand that the device and the method as disclosed can be implemented in other manners. For example, the embodiments of the device are only for illustration, e.g., the division of the unit only shows a function division in logic, but in an actual realization, there are other forms of divisions; for example, a plurality of units or components can be combined or can be integrated into another device, or some features can be ignored or are not be carried out.

The above descriptions only illustrate the specific embodiments of the present invention, and the protection scope of the present invention is not limited to this. Given the teaching as disclosed herein, variations or substitutions, which can easily occur to any skilled pertaining to the art, should be covered by the protection scope of the present invention. Thus, the protection scope of the present invention is defined by the claims.

What is claimed is:

1. A method for authenticating a liveness face, comprising:
   generating a character string randomly and showing the same to an object to be authenticated;
   recognizing facial actions of the object to be authenticated;
   determining whether the facial actions match with pronunciation of the character string to obtain a first determination result; and
   judging whether the object to be authenticated is a liveness face based on the first determination result,
   wherein determining whether the facial actions match with the pronunciation of the character string comprises determining whether the facial actions match with the pronunciation of the character string by using a trained neuronal network, and
   the trained neuronal network is obtained by:
   acquiring a plurality of training images corresponding to the character string, the respective training images comprising facial images of different persons as they speak the character string;
   determining specified key points which are easy to be covered by a mask among key points on the face;
   generating a feature vector sequence of a plurality of key points including the specified key points on the face in each of the training images; and
   training the neuronal network by using the generated respective feature vector sequences, and
   wherein the trained neuronal network comprises:
   an input layer configured to receive the feature vector sequences,
   a convolution layer configured to smooth the input vectors and extract their features,
   a feedback layer configured to extract current input features by associating the previous and later input features, the feedback layer being implemented by a long short term memory,
   a fully connected layer configured to further abstract the features, and
   an output layer configured to output a final judgment result.

2. The method for authenticating a liveness face of claim 1, wherein the recognizing facial actions of the object to be authenticated comprises:
   acquiring a facial image of the object to be authenticated;
   analyzing the facial image to obtain attributes of a face; and
   determining the facial actions based on the obtained attributes of the face.

3. The method for authenticating a liveness face of claim 2, wherein
   the analyzing the facial image to obtain attributes of the face comprises obtaining positions of key points on the face as the attributes of the face by analyzing each frame of the facial image; and
   the determining the facial actions based on the obtained attributes of the face comprises determining the facial actions based on changes in the positions of the key points in respective frames of facial image.

4. The method for authenticating a liveness face of claim 1, wherein the determining whether the facial actions match with the pronunciation of the character string by using a trained neuronal network comprises:
   determining, by the trained neuronal network, a probability that the object to be authenticated speaks the character string based on the facial actions; and
   determining the facial actions match with the pronunciation of the character string when the determined probability is greater than a predetermined probability.

5. The method for authenticating a liveness face of claim 1, further comprises:
   acquiring audio information of the object to be authenticated during a predetermined period of time; and
   determining whether the audio information matches with the pronunciation of the character string to obtain a second determination result.

6. The method for authenticating a liveness face of claim 5, wherein the judging whether the object to be authenticated is a liveness face based on the first determination result comprises: judging whether the object to be authenticated is a liveness face based on both of the first determination result and the second determination result.

7. The method for authenticating a liveness face of claim 6, wherein the judging whether the object to be authenticated is a liveness face based on both of the first determination result and the second determination result comprise:
   judging that the object to be authenticated is not a liveness face if the second determination result indicates that the audio information does not match with the pronunciation of the character string; and
   in a case where the second determination result indicates that the audio information matches with the pronunciation of the character string, judging the object to be authenticated is a liveness face if the first determination result indicates that the facial actions match with the pronunciation of the character string, and judging the object to be authenticated is not a liveness face if the first determination result indicates that the facial actions do not match with the pronunciation of the character string.

8. An apparatus for authenticating a liveness face, comprising:
   a processor;
   a storage; and
   computer program instructions stored in the storage, as executed by the processor, the computer program instructions perform steps of:
     generating a character string randomly and showing the same to an object to be authenticated;
     recognizing facial actions of the object to be authenticated;
     determining whether the facial actions match with pronunciation of the character string to obtain a first determination result; and
     judging whether the object to be authenticated is a liveness face based on the first determination result,
   wherein determining whether the facial actions match with the pronunciation of the character string comprises determining whether the facial actions match with the pronunciation of the character string by using a trained neuronal network, and
   the trained neuronal network is obtained by:
     acquiring a plurality of training images corresponding to the character string, the respective training images comprising facial images of different persons as they speak the character string;
     determining specified key points which are easy to be covered by a mask among key points on the face;
     generating a feature vector sequence of a plurality of key points including the specified key points on the face in each of the training images; and
     training the neuronal network by using the generated respective feature vector sequences, and
   wherein the trained neuronal network comprises:
     an input layer configured to receive the feature vector sequences,
     a convolution layer configured to smooth the input vectors and extract their features,
     a feedback layer configured to extract current input features by associating the previous and later input features, the feedback layer being implemented by a long short term memory,
     a fully connected layer configured to further abstract the features, and
     an output layer configured to output a final judgment result.

9. The apparatus for authenticating a liveness face of claim 8, wherein the recognizing facial actions of the object to be authenticated comprises:
   acquiring a facial image of the object to be authenticated;
   analyzing the facial image to obtain attributes of a face; and
   determining the facial actions based on the obtained attributes of the face.

10. The apparatus for authenticating a liveness face of claim 9, wherein
   the analyzing the facial image to obtain attributes of the face comprises obtaining positions of key points on the face as the attributes of the face by analyzing each frame of the facial image; and
   the determining the facial actions based on the obtained attributes of the face comprises determining the facial actions based on changes in the positions of the key points in respective frames of facial image.

11. The apparatus for authenticating a liveness face of claim 8, wherein the determining whether the facial actions match with the pronunciation of the character string by using a trained neuronal network comprises:
   determining, by the trained neuronal network, a probability that the object to be authenticated speaks the character string based on the facial actions; and
   determining the facial actions match with the pronunciation of the character string when the determined probability is greater than a predetermined probability.

12. The apparatus for authenticating a liveness face of claim 8, further comprises an audio collecting device, and as executed by the processor, the computer program instructions further perform steps of:
   acquiring, by the audio collecting device, audio information of the object to be authenticated during a predetermined period of time; and
   determining whether the audio information matches with the pronunciation of the character string to obtain a second determination result.

13. The apparatus for authenticating a liveness face of claim 12, wherein the judging whether the object to be authenticated is a liveness face based on the first determination result comprises: judging whether the object to be authenticated is a liveness face based on both of the first determination result and the second determination result.

14. The apparatus for authenticating a liveness face of claim 13, wherein the judging whether the object to be authenticated is a liveness face based on both of the first determination result and the second determination result comprises:
   judging that the object to be authenticated is not a liveness face if the second determination result indicates that the audio information does not match with the pronunciation of the character string; and
   in a case where the second determination result indicates that the audio information matches with the pronunciation of the character string, judging the object to be authenticated is a liveness face if the first determination result indicates that the facial actions match with the pronunciation of the character string, and judging the object to be authenticated is not a liveness face if the first determination result indicates that the facial actions do not match with the pronunciation of the character string.

15. A computer program product for authenticating a liveness face, which comprises a non-transitory computer-readable storage medium on which computer program instructions are stored, as executed by a processor, the computer program instructions enables the processor to:

generate a character string randomly and show the same to an object to be authenticated;

recognize facial actions of the object to be authenticated;

determine whether the facial actions match with pronunciation of the character string to obtain a first determination result; and judge whether the object to be authenticated is a liveness face based on the first determination result, wherein determining whether the facial actions match with the pronunciation of the character string comprises determining whether the facial actions match with the pronunciation of the character string by using a trained neuronal network, and the trained neuronal network is obtained by:

acquiring a plurality of training images corresponding to the character string, the respective training images comprising facial images of different persons as they speak the character string;

determining specified key points which are easy to be covered by a mask among key points on the face;

generating a feature vector sequence of a plurality of key points including the specified key points on the face in each of the training images; and training the neuronal network by using the generated respective feature vector sequences, and wherein the trained neuronal network comprises:

an input layer configured to receive the feature vector sequences, a convolution layer configured to smooth the input vectors and extract their features, a feedback layer configured to extract current input features by associating the previous and later input features, the feedback layer being implemented by a long short term memory, a fully connected layer configured to further abstract the features, and an output layer configured to output a final judgment result.

16. The computer program product of claim 15, wherein the computer program instructions further enables the processor to:

acquire audio information of the object to be authenticated during a predetermined period of time; and determine whether the audio information matches with the pronunciation of the character string to obtain a second determination result.

17. The computer program product of claim 16, wherein the judging whether the object to be authenticated is a liveness face based on the first determination result comprises:

in a case where the second determination result indicates that the audio information matches with the pronunciation of the character string, judging the object to be authenticated is a liveness face if the first determination result indicates that the facial actions match with the pronunciation of the character string, and judging the object to be authenticated is not a liveness face if the first determination result indicates that the facial actions do not match with the pronunciation of the character string.

* * * * *